Oct. 11, 1932.   C. JARVIS   1,882,630

TURBINE

Filed Sept. 30, 1929   2 Sheets-Sheet 1

Inventor,
Christopher Jarvis.

By
Attorneys.

Oct. 11, 1932.   C. JARVIS   1,882,630
TURBINE
Filed Sept. 30, 1929   2 Sheets-Sheet 2

Inventor,
Christopher Jarvis.

Patented Oct. 11, 1932

1,882,630

UNITED STATES PATENT OFFICE

CHRISTOPHER JARVIS, OF MONTEVIDEO, MINNESOTA

TURBINE

Application filed September 30, 1929. Serial No. 396,251.

The present invention relates to turbines and the object of the invention is to reduce the loss of energy in such machines due to fluid friction.

The word "turbine" is here employed to include both turbines and turbo-compressors.

By this invention, instead of providing a large number of small passages in parallel or series, a relatively small number of large passages or chambers are provided, the total area of the surface along which fluid is adapted to pass being consequently reduced.

The invention may be described in its application to turbines.

The machine may comprise a stator and a rotor or two oppositely moving rotors but for the purpose of this description it will be assumed that a stator and rotor are employed and that the rotor is located internally of the stator.

One or more open ended recesses or troughs relatively shallow radially and axially broad are provided about the inner periphery of the stator and outer periphery of the rotor so that two coincident chambers, one on the stator and one on the rotor form a long, shallow and fairly broad trough which is adapted to increase in length as the rotor moves in one direction relatively to the stator.

The axis of a complete trough is preferably an arc eccentric of substantially the same radius as the periphery of the rotor.

The closed end of each trough is arcuate, and preferably semicircular in circumferential section and one or more radial guide vanes is or are provided between the sides of the compartments.

The working fluid is admitted at the side of one or more of the compartments and flows round the troughs tending to increase the length thereof and so causing rotation of the rotor.

The troughs are of substantially elliptical form in circumferential section and the working fluid of high velocity moves around the outer part thereof and follows a substantially vertical path, fluid moving at lower velocities gradually moving towards the centre of the troughs and ultimately exhausting through an opening which is located preferably at the centre of curvature of the end wall of a compartment.

These exhaust openings may be provided either in the stator or the rotor and in order to provide for admission of the working fluid one set of compartments i. e. either those of the stator or rotor, are formed broader than the other set.

Semicircular hoods are preferably provided at the exhaust ports to deflect or guide the working fluid to the ports and such hoods may be formed as extensions of the above mentioned radial vanes.

The invention is more particularly described with reference to the accompanying drawings which show one form of construction by way of example and in which:—

Figure 1:
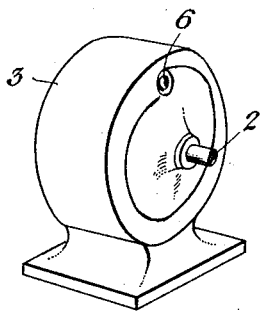
Figure 1 is an external perspective view.

In the drawings dots indicate arrows coming whilst small crosses indicate arrows going.

Figure 6:
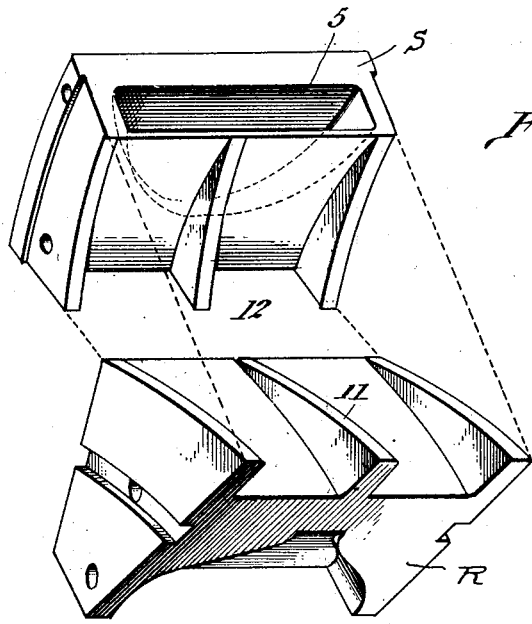
Figures 6 and 7 are perspective views each showing a stator and a rotor block in perspective.
Figure 7:
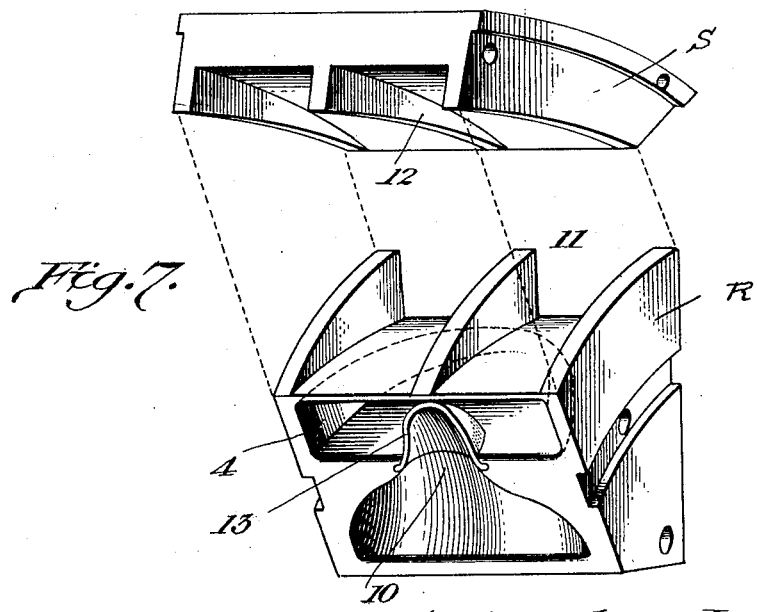

In the form shown in the drawings a turbine comprises a cylindrical rotor 1 mounted on a shaft 2 and an annular casing or stator 3, each of which is comprised of a plurality of rotor blocks R and a plurality of stator blocks S (Figs. 6 and 7), and has relatively axially wide and radially shallow recesses or troughs 4, 5 extending respectively from the outer and inner peripheral surfaces thereof.

As will be seen from the drawings, a pair of such troughs, one on the stator and one on the rotor form, when in line with each other, a relatively long chamber extending continuously from the stator to the rotor, each chamber so formed being curved in elevational view and eccentric of the axis of rotation of the rotor.

The recesses 4 are slightly wider than recesses 5 so that working fluid, for instance steam at high velocity, may be admitted through a port 6 to flow along an annular duct 7 formed in a side wall 8 of the turbine and to enter the troughs through the gap 7a so formed by the difference in width of the troughs.

The working fluid, as shown by arrows 9 in the drawings, moves round the troughs in a substantially vertical path, the reaction pressure on the walls of the troughs, due to change of velocity of the fluid on deflection by said walls, causing the rotor 1 to rotate. The extraction of energy from the working fluid for driving the rotor will cause reduction of velocity of the fluid which will consequently move round the troughs in paths more nearly approaching the centre thereof until finally it is exhausted through ports 10 located at the midwidth of the troughs.

Radial guide vanes 11, 12 are provided in the troughs 4 and 5, respectively, and extend for a distance from the opened ends thereof over a portion of the length of each trough. Upstanding walls or hoods 13 partially encircling the exhaust ports 10 are provided one at the inner end of each vane 11 for guiding low velocity fluid into said ports.

Figure 3:
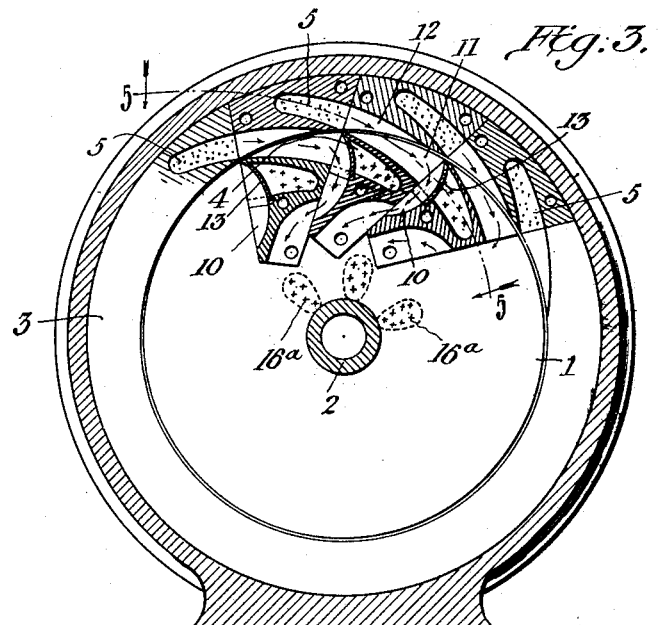
Figure 3 is a side sectional elevation on the line 3—3 of Figure 2.
Figure 2:
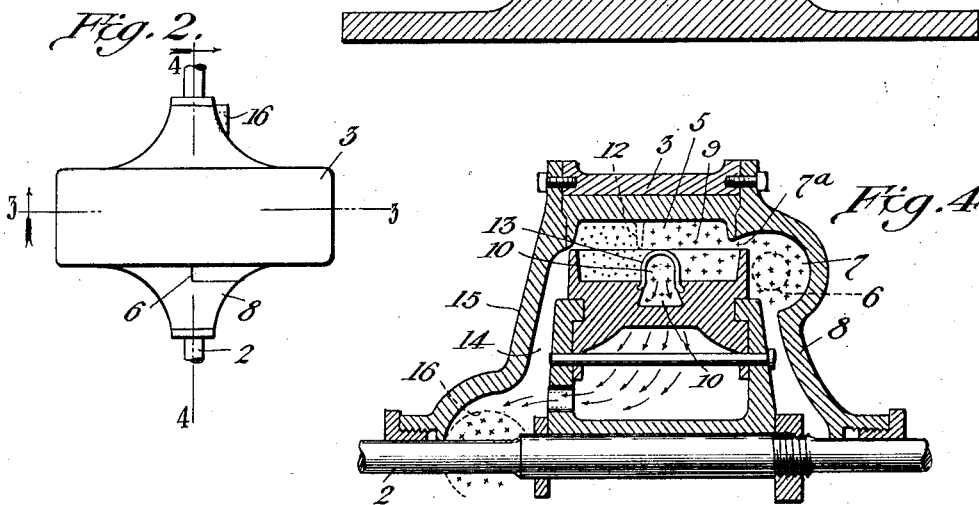
Figure 2 is an external plan view.
Figure 4:
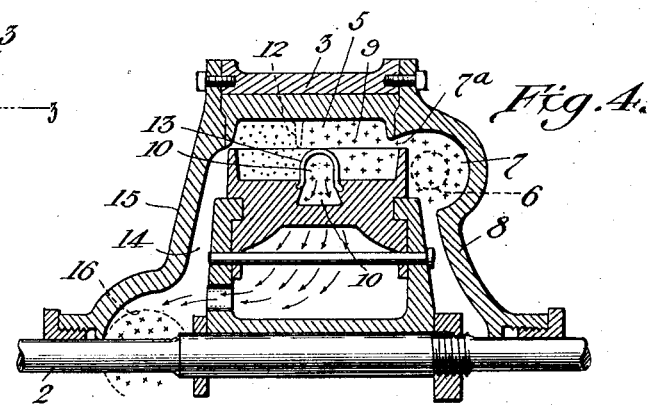
Figure 4 is an end sectional elevation on the line 4—4 of Figure 2.
Figure 5:
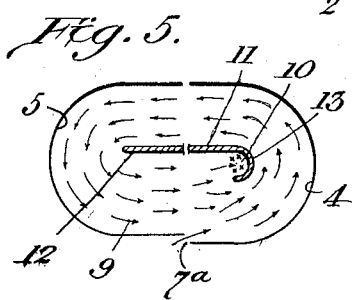
Figure 5 is a sectional plan view along the line 5—5 of Figure 3 showing the shape of the troughs.

These hoods may be formed integral with the vanes 11, but, when the turbine is made up of sectional blocks, as indicated by the dash lines in Fig. 3, one edge of the upstanding walls or hoods 13 form continuations of the guide vanes 11 as shown in Figure 5.

It will be appreciated that whilst the recesses in the stator and rotor are shown in line with each other Figure 3, this is only a quickly recurring momentary position and in all intermediate positions, the working fluid passes from one recess on one member to two recesses on the other.

The exhausted fluid is conducted from the ports 10 first inward toward the shaft 2 and then axially into and through a passage 14 formed in side wall 15 to an opening 16 in the turbine casing, as shown by the crosses at 16a (Fig. 3).

If desired of course, the fluid may be admitted to and exhausted from the troughs in the outer casing.

I declare that what I claim is:

1. A turbine comprising an inner cylindrical member having at least one recess or trough extending non-radially from the peripheral surface thereof and closed at its radially inner end, an annular member concentric with said cylindrical member having at least one corresponding recess or trough extending non-radially from the inner peripheral surface thereof and closed at its radially outer end and means for supplying high velocity fluid to the periphery of said recesses or troughs, the troughs of one of said members having an opening adjacent the centre thereof for escape of the fluid therefrom.

2. A turbine comprising an inner cylindrical member having relatively long, axially wide and radially shallow recesses or troughs extending non-radially from the peripheral surface thereof and closed at their radially inner ends, an annular member concentric with said cylindrical member having troughs or recesses similar and corresponding to those of the cylindrical member extending non-radially from the inner peripheral surface thereof and closed at their radially outer ends and means for supplying high velocity fluid to the periphery of said recesses or troughs, the troughs of one of said members having an opening adjacent the centre thereof for escape of the fluid therefrom.

3. A turbine comprising a rotatable cylindrical member having relatively long, axially wide and radially shallow recesses or troughs extending non-radially from the peripheral surface thereof and closed at their radially inner ends, a stationary annular member concentric with said rotatable member having troughs or recesses similar and corresponding to those of the cylindrical member extending non-radially from the inner peripheral surface thereof and closed at their radially outer ends and means for supplying high velocity fluid to the periphery of said recesses or troughs, the troughs of one of said members having an opening adjacent the centre thereof for escape of the fluid therefrom.

4. A turbine comprising an inner cylindrical member and an annular member concentric therewith each of said members having troughs or recesses extending respectively from the outer and inner peripheral surfaces thereof so that a recess in the inner member and a recess in the annular member when in line form a longitudinally continuous chamber closed at its ends and means for supplying high velocity fluid to the periphery of said recesses or troughs, the troughs of one of said members having an opening adjacent the centre thereof for escape of the fluid therefrom.

5. A turbine comprising an inner cylindrical member and an annular member concentric therewith each of which members have relatively axially wide and radially shallow troughs or recesses extending eccentrically from the outer and inner peripheral surfaces thereof so that a recess in the inner member and a recess in the outer member when in line form a longitudinal continuous chamber closed at its ends and means for supplying high velocity fluid to the periphery of said recesses or troughs, the troughs of one of said members having an opening adjacent the centre thereof for escape of the fluid therefrom.

6. A turbine comprising an inner cylindrical member and an annular member concentric therewith each of which members have relatively axially wide and radially shallow troughs or recesses extending eccentrically from the outer and inner peripheral surfaces thereof so that a recess in the inner member and a recess in the outer member when in line form a longitudinal continuous chamber closed at its ends and the width of the troughs on one member being greater than the width of the troughs on the other member so as to provide an opening for supplying high velocity fluid to the periphery of the troughs of greater width, the troughs of one of said members having an opening adjacent the centre thereof for escape of the fluid therefrom.

7. A turbine comprising an inner cylindrical member having at least one recess or trough extending non-radially from the peripheral surface thereof, and closed at its radially inner end, an annular member concentric with said cylindrical member having at least one corresponding recess or trough extending non-radially from the inner peripheral surface thereof and closed at its radially outer end, radial vanes located substantially at the mid-axial width of the troughs and extending over a portion of the length of the troughs, means for supplying high velocity fluid to the periphery of said recesses or troughs, the troughs of one of said members having an opening adjacent the centre thereof for escape of the fluid therefrom.

8. A turbine comprising an inner cylindrical member having relatively long, axially wide and radially shallow recesses or troughs extending non-radially from the peripheral surface thereof and closed at its radially inner end, an annular member concentric with said cylindrical member having troughs or recesses similar and corresponding to those of the cylindrical member extending non-radially from the inner peripheral surface thereof and closed at its radially outer end, radial vanes located substantially at the mid-axial width of the troughs and extending over a portion of the length of the troughs, means for supplying high velocity fluid to the periphery of said recesses or troughs, the troughs of one of said members having an opening adjacent the centre thereof for escape of the fluid therefrom.

9. A turbine comprising an inner cylindrical member having at least one recess or trough extending non-radially from the peripheral surface thereof and closed at its radially inner end, an annular member concentric with said cylindrical member having at least one corresponding recess or trough extending non-radially from the inner peripheral surface thereof and closed at its radially outer end, the mouths of each pair of adjacent troughs on one element converging substantially to a knife-edge, means for supplying high velocity fluid to the periphery of said recesses or troughs, the troughs of one of said members having an opening adjacent the centre thereof for escape of the fluid therefrom.

10. A turbine comprising an inner cylindrical member having recesses or troughs extending non-radially from the peripheral surface thereof and closed at its radially inner end, an annular member concentric with said cylindrical member having recesses or troughs extending non-radially from the inner peripheral surface thereof and closed at its radially outer end, means for supplying high velocity fluid to the periphery of said recesses, exhaust ports for withdrawing low velocity fluid adjacent the mid-axial width of the recesses of one member, radial vanes located substantially at the mid axial width of the recess and extending over a portion of the length of the troughs and hoods partially encircling the mouths of said exhaust ports.

In witness whereof, I have hereunto signed my name this 23rd day of September, 1929.

CHRISTOPHER JARVIS.